United States Patent
Sparlin

[15] 3,692,116
[45] Sept. 19, 1972

[54] CONTROL OF INCOMPETENT FORMATIONS
[72] Inventor: Derry D. Sparlin, Ponca City, Okla. 74601
[73] Assignee: Continental Oil Company, Ponca City, Okla.
[22] Filed: June 1, 1971
[21] Appl. No.: 148,946

[52] U.S. Cl. .................................................166/295
[51] Int. Cl. .............................................E21b 33/13
[58] Field of Search...............166/295, 292, 281, 285

[56] References Cited

UNITED STATES PATENTS

| | | | |
|---|---|---|---|
| 3,022,825 | 2/1962 | Winsaver | 166/295 |
| 3,047,067 | 7/1962 | Williams | 166/295 |
| 3,097,692 | 7/1963 | Holland | 166/295 |
| 3,199,590 | 8/1965 | Young | 166/295 |
| 3,209,826 | 10/1965 | Young | 166/295 X |
| 3,285,339 | 11/1966 | Walther | 166/295 |
| 3,391,738 | 7/1968 | Sparlin | 166/295 |
| 3,497,010 | 2/1970 | Copeland | 166/295 |

*Primary Examiner*—Robert L. Wolfe
*Attorney*—Joseph C. Kotarski, Henry H. Huth and Robert B. Coleman, Jr.

[57] ABSTRACT

An incompetent formation is controlled by admixing to form a mixture consisting essentially of an organic polymer precursor, a coupling agent, an aqueous acidic catalyst, a hydrocarbon carrier, and a hydrocarbon soluble acidic catalyst; and positioning the mixture in contact with the incompetent formation.

6 Claims, No Drawings

CONTROL OF INCOMPETENT FORMATIONS

BACKGROUND OF THE INVENTION

This invention relates to control of incompetent formations.

In the production of subterranean fluids, such as oil, gas, water, etc., a number of difficulties are encountered when the well by which the fluids are produced penetrates a loose or unconsolidated subterranean formation. Such formations frequently are composed of loose water or oil sands, and the grains of the sand become entrained in the fluid being produced to be carried into the well bore. The result of such entrainment, among other things, is the abrasion of the pumping equipment in the well bore, the clogging of strainers, and the sanding in of the cavity immediately adjacent the strainer. These results in turn ultimately cause a sharp decrease in the rate of production and high maintenance costs.

In order to mitigate the deleterious effects associated with incompetent formations, a number of remedies have been proposed. Thus, U.S. Pat. No. 3,285,339 discloses one very advantageous method for controlling incompetent earth formations. According to the teaching of that invention, incompetent formations are controlled by mixing together siliceous sand, an organic polymer precursor, a coupling agent, and an aqueous acidic catalyst; and positioning the slurry in contact with a portion of the incompetent formation. However, the method disclosed by U.S. Pat. No. 3,285,339 sometimes suffers a drawback in that the resin precursor is diluted by the aqueous vehicle associated with the aqueous acidic catalyst. Thus, particularly when relatively low temperatures are encountered in the incompetent formation to be controlled, the dilution of the organic polymer precursor with the aqueous vehicle can result in slow curing times and less than maximum strength of the controlled incompetent formation. Use of larger quantities of aqueous acidic catalyst only aggravates the problem by increasing the dilution.

The processes disclosed by U.S. Pat. No. 3,404,735 and U.S. Pat. No. 3,209,826 disclose use of an oil soluble acidic catalyst for catalyzing organic polymers employed to consolidate incompetent formations. However, the teaching of these inventions is limited to disclosing the use of such catalysts as a separate step or overwash operation after the materials to be catalyzed are in place in the incompetent formation. These processes, while also of considerable value, still do not provide an optimum solution for the problem. Thus, i.e., relatively large amounts of hydrocarbon soluble acidic catalyst are necessary for operation. Much of the organic polymer precursor and catalyst are spread into the formation away from the wellbore where they are ineffective or have deleterious effects on the formation. More of the organic polymer precursor is washed out of the sand pack by the overwash operation leaving an amount of resin which is insufficient to form a strongly bonded sand pack. Furthermore, incompetent formations solidified according to these processes often are not catalyzed uniformly throughout, and soft spots occur in the interior of the consolidated zone thus detracting from the overall integrity and strength of the consolidated formation.

OBJECTS OF THE INVENTION

An object of the invention is to control an incompetent formation.

A further object is to overcome deficiencies in prior art methods of controlling incompetent formations.

These, and other objects and advantages will appear from the following description of the embodiments of the invention, and the most novel features, will be particularly pointed out hereinafter in connection with the appended claims.

SUMMARY OF THE INVENTION

In one aspect, this invention discloses a method for controlling an incompetent formation comprising admixing to form a mixture consisting essentially of an organic polymer precursor, a coupling agent, an aqueous acidic catalyst, a hydrocarbon carrier, and a hydrocarbon soluble acidic catalyst; and thence positioning the mixture in contact with the incompetent formation.

DESCRIPTION OF THE PREFERRED EMBODIMENTS

The mixture which is contacted with an incompetent formation to control the incompetent formation according to the process of this invention contains a coupling agent as an essential component. The coupling agent can be any material known to the art to promote adhesion of an organic polymer to mineral matter. In particular, any one or combination of the coupling agents disclosed by U.S. Pat. No. 3,285,339 can be employed. A particularly presently preferred coupling agent is gamma-aminopropyl-triethoxysilane. Often, in the range of about 0.002 to 0.04 parts by weight of coupling agent can be employed for each part by weight of organic polymer precursor. Below about 0.002 parts by weight of coupling agent is largely ineffective while quantities above about 0.04 parts by weight are not economically feasible. More preferably, in the range of 0.01 to 0.02 parts by weight of coupling agent are employed for each part by weight of organic precursor to provide optimum effectiveness at an economically feasible cost.

The mixture also contains a hydrocarbon carrier as an essential component. Any hydrocarbon which is substantially completely nonreactive with the aqueous acidic catalyst, the coupling agent, and the organic polymer precursor; which is clean and free of solids; and which is a liquid at the temperatures and pressures specified can be employed. Preferably, the hydrocarbon carrier is a liquid at temperatures in the range of about 0° to about 100° C (at atmospheric pressure). Mixtures of hydrocarbons are also suitable. Examples of suitable hydrocarbon carriers include: kerosine, diesel fuel, certain crude oils, fuel oils, naphtha, and the like. Often, in the range of 2 to 500 parts by weight of hydrocarbon carrier can be employed for each part by weight of organic polymer precursor. Less than about 2 parts by weight of hydrocarbon carrier is not sufficient to dilute and carry the other components while greater than about 500 parts by weight effects too much dilution. Preferably, in the range of 4 to 30 parts by weight of hydrocarbon carrier are employed for each part by weight of organic polymer precursor for optimum results.

The mixtures employed according to the process of this invention also include an aqueous acidic catalyst as an essential component thereof. The aqueous acidic catalyst can include any aqueous solution of any acidic catalyst known to promote curing of an organic polymer precursor. Examples of some suitable aqueous acidic catalysts include: hydrochloric acid, hypophosphorous acid, phosphoric acid, sulfuric acid, and the like. The acidic component of the aqueous acidic catalyst must be in aqueous solution. Often, it is preferable that the acidic catalyst be at the maximum soluble concentration in the aqueous solution. Often, in the range of about 0.001 to about 0.20 parts by weight of acidic catalyst component of an aqueous acidic catalyst are employed for each part by weight of organic polymer precursor. Less than about 0.001 parts of acidic catalyst are insufficient to provide curing in feasible amounts of time while greater than about 0.20 parts of acidic catalyst dilute the components to such an extent that strength of the resulting cured composition is deleteriously affected. More preferably, in the range of 0.01 to 0.16 parts by weight per part by weight are employed for optimum results.

The mixture employed according to the process of this invention also includes an organic polymer precursor as an essential component thereof. The organic polymer precursor is presently preferred to be a polymeric precursor to a resinous phenol-formaldehyde resin or a polymeric precursor to a phenolic-furan resin. However, other resins of the thermosetting type, such as alkyd resins and acrylic resins are suitable. Examples of suitable resins are disclosed in U.S. Pat. No. 3,285,339, issued to Walther et al. Such organic polymer precursors are widely available from commercial sources. The mixture employed according to the process of this invention often contains in the range of about 0.01 to 0.40 percent by weight of organic polymer precursor. Less than about 0.01 percent of polymer precursor does not give satisfactory strength of the consolidated formation whereas greater than about 0.40 percent is not economically feasible. More preferably, in the range of 0.10 to 0.20 weight percent is employed for optimum results and economic feasibility.

The final essential component in the mixtures of this invention is a hydrocarbon soluble acidic catalyst. This hydrocarbon soluble acidic catalyst can be any material which is soluble in the hydrocarbon carriers defined to be used according to the process of this invention which is known to be useful to cure the organic polymer precursors of this invention. Some examples of suitable hydrocarbon soluble acidic catalysts are disclosed by U.S. Pat. No. 3,209,826 issued to Young. Presently, particularly preferred as suitable hydrocarbon soluble acidic catalysts are sulfonated hydrocarbons, sulfated hydrocarbons, and halogenated hydrocarboncarboxylic acids which are represented as follows:

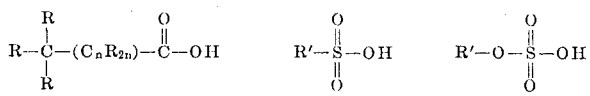

wherein R is hydrogen or halogen; wherein $n$ is in the range of 0 to 8; and wherein R' is an alkyl, aralkyl, alkaryl, or aryl radical having in the range of one to 15 carbon atoms.

Some examples of suitable hydrocarbon soluble acidic catalysts include:
trichloroacetic acid
2,2,5,10-tetrabromodecanoic acid
10-iododecanoic acid
8-fluorodecanoic acid
methanesulfonic acid
pentadecanesulfonic acid
2,2-dimethyldodecanesulfonic acid
phenylmethanesulfonic acid
9-phenylnonanesulfonic acid
4-methylbenzenesulfonic acid
3-nonylbenzenesulfonic acid
benzenesulfonic acid
2-naphthalenesulfonic acid
propanesulfinic acid
pentadecanesulfinic acid
2,2-dimethyldodecanesulfinic acid
phenylmethanesulfinic acid
9-phenylnonanesulfinic acid
4-methylbenzenesulfinic acid
3-nonylbenzenesulfinic acid
benzenesulfinic acid
2-naphthalenesulfinic acid
and the like.

Often, in the range of about 0.01 to 0.10 parts by weight of hydrocarbon soluble acidic catalysts are employed for each part by weight of organic precursor. Less than about 0.01 parts by weight does not provide sufficient increase in strength of the resulting controlled formation whereas greater than about 0.10 parts by weight is not feasible economically for the minimum additional benefit effected by greater than that amount. It is presently particularly preferred to employ in the range of about 0.02 to 0.05 parts by weight of hydrocarbon soluble acidic catalyst or part by weight of organic polymer precursor to effect optimum benefit at the most feasible cost.

The admixtures of this invention are formed by admixing the components by any means known to the art for admixing fluids. For example, blenders, mechanical mixers, proportionators, and the like can be employed.

The mixtures of this invention are prepared and employed at temperatures such that they are in the liquid state. Generally, temperatures in the range of about 0 to 35° C are suitable and are most convenient.

Upon preparation, the mixtures of this invention are placed in contact with the incompetent formation which it is desired to control by any means known to the art for contacting incompetent formations with prior art materials. For example, the mixtures of this invention can be contacted with the incompetent formation according to the method disclosed for contacting incompetent formations with the materials of U.S. Pat. No. 3,285,339, issued to Walther et al.

EXAMPLES

EXAMPLE 1

A series of four slurries were prepared by blending amounts of various components as are listed in the following, Table 1:

TABLE 1

| Component | Quantity |
|---|---|
| 40-60 U.S. Mesh Ottawa sand | 600 grams |

| | | |
|---|---|---|
| fuel oil[3] | 187 ml | |
| pale oil No. 400[4] | precursor[1] 63 ml | |
| phenolic-furan polymer precursor(1) | 88 ml | |
| silane A1100[2] | 0.2 ml | |
| 50 wt. % aqueous hypophosphorous acid | 13.2 ml | |

Of the four slurries, three were then modified by admixing therewith varying amounts of trichloroacetic acid (TCAA). Each the slurries was then cured at approximately 25° C for varying lengths of time, and compressive strengths for each resulting product were determined. Results are presented in the following, Table 2:

TABLE 2

| Slurry No. | Amount TCAA | % TCAA g/cc | Compressive Strength (PSI) 2 days | 3 days | 6 days |
|---|---|---|---|---|---|
| A | None | 0 | 108 | 199 | 274 |
| B | 1.0 | 1.25 | 144 | 208 | 311 |
| C | 2.0 | 2.25 | 193 | 232 | 300 |
| D | 4.0 | 4.54 | 260 | 308 | 394 |

[1]This is a single component hydroxy aryl aldehyde resin prepared by reacting together at 60 to 70°C 500 grams phenol, 40 grams 37-percent aqueous solution of formaldehyde and 25 grams sodium hydroxide dissolved in 25 grams water until the formaldehyde was fully combined. To this mixture was added 50 grams resorcinol and 50 grams 37-percent aqueous solution of formaldehyde. The resulting mixture was refluxed and dehydrated under vacuum to a viscosity of 3200 cps. The resin was then mixed with furfuryl alcohol in a ratio of 1 to 2 parts by volume to form Resin D.
[2]γ-aminopropyltriethoxysilane
[3]The fuel oil employed had an API gravity of 2.8, a C/H ratio of 9.95, a molecular weight of 328, a flash point of 240°F, and a SSU viscosity at 210°F of 8.53
[4]The pale oil No. 400 had an API gravity of 30.0, a C/H ratio of 6.3, a molecular weight of 482, a SSU viscosity at 100°F of 399.3, at 210°F of 57.61, a pour point of 0°F, and an ASTM color of 2. It was a refined paraffinic mineral oil.

This example demonstrates that employing a hydrocarbon soluble acidic catalyst in combination with a mixture consisting essentially of an organic polymer precursor, a coupling agent, an aqueous acidic catalyst, and a hydrocarbon carrier results in greatly improved compressive strength in the resulting hardened material which is developed much more rapidly at lower curing temperatures.

EXAMPLE 2

Another series of four slurries was admixed containing amounts of components as are disclosed in the following, Table 3:

TABLE 3

| Component | Quantity |
|---|---|
| 40–60 Mesh Ottawa sand | 600 grams |
| pale oil No. 400[4] | 63 ml |
| fuel oil[3] | 188 ml |
| phenolic-furan polymer precursor[1] | 63 ml |
| silane A1100[2] | 0.4 ml |
| 50 wt. % aqueous hypophosphorous acid | 10.0 ml |

Each slurry was then cured at about 25° C for varying lengths of time and compressive strengths of the cured materials were determined with results as disclosed in the following, Table 4:

TABLE 4

| Slurry No. | Additive Type | Amount | % g/ml Plastic | Compressive strengths (PSI) 2 days | 3 days | 6 days |
|---|---|---|---|---|---|---|
| A | TCAA | 2.9 g | 4.6 | 176 | 258 | 363 |
| B | TCAA | 5.8 g | 9.2 | 194 | 272 | 400 |
| C | TCAA | 8.7 g | 13.8 | 190 | 272 | 378 |
| D | Conc. HCl | 3.3 ml | 5.25 | 113 | 168 | 209 |

This example demonstrates that a hydrocarbon soluble acidic catalyst is effective to promote rapid curing of admixtures consisting essentially of an organic polymer precursor, a coupling agent, an aqueous acidic catalyst, and a hydrocarbon carrier at relatively low curing temperatures to high compressive strengths. Run D in comparison to the other runs of this example also demonstrates that adding additional aqueous acidic catalyst is not effective to produce the desired result of rapid curing to high compressive strengths at relatively low temperatures.

EXAMPLE 3

A slurry suitable for consolidating an incompetent formation according to the process of this invention was formulated by admixing components in amounts as disclosed by the following, Table 5:

TABLE 5

| Component | Quantity |
|---|---|
| 40–60 U.S. Mesh Ottawa sand | 300 grams |
| fuel oil[4] | 94 ml |
| pale oil No. 400[4] | 32 ml |
| phenolic-furan polymer precursor[1] | 44 ml |
| silane A1100[2] | 0.2 ml |
| 50 wt. % aqueous solution of $H_3PO_2$ | 6.6 ml |
| trichloroacetic acid | 2 grams |

The slurry was cured at about 25° C for three days. At the end of that time, the resulting hardened material was determined to have a compressive strength of 752 psi.

A slurry identical to the first slurry of this example was admixed except that it did not contain any trichloroacetic acid. Instead, 450 ml of a solution containing 2 weight percent trichloroacetic acid in diesel oil was applied to the slurry as an overflush according to the teachings of U.S. Pat. No. 3,209,826 and U.S. Pat. No. 3,404,735. The slurry was then cured at about 25° C for three days. Compressive strength of the cured material was determined to be 255 psi.

The above two runs of this example demonstrate that the method for controlling an incompetent formation according to this invention comprising admixing a mixture consisting essentially of an organic polymer precursor, a coupling agent, an aqueous acidic catalyst, a hydrocarbon carrier, and a hydrocarbon soluble acidic catalyst provides cured materials useful for controlling an incompetent formation which have substantially superior compressive strength to materials formed by admixing a mixture consisting essentially of an organic polymer precursor, a coupling agent, an aqueous acidic catalyst and a hydrocarbon carrier; and then overflushing with a hydrocarbon soluble acidic catalyst in a hydrocarbon carrier as suggested by the teachings of U.S. Pat. No. 3,404,735 and U.S. Pat. No. 3,209,826.

We claim:

1. A method for controlling an incompetent formation comprising:
   a. admixing to form a mixture consisting essentially of an organic polymer precursor, a coupling agent, an aqueous acidic catalyst, a hydrocarbon carrier, sand, and a hydrocarbon soluble acidic catalyst;
   b. positioning the mixture in contact with the incompetent formation.

2. The method of claim 1 wherein the organic polymer precursor is a partially polymerized phenol-formaldehyde resin mixture.

3. The method of claim 2 wherein the coupling agent is gamma-aminopropyltriethoxysilane.

4. The method of claim 2 wherein the hydrocarbon soluble acidic catalyst is a sulfonated hydrocarbon, a sulfated hydrocarbon, or a halogenated hydrocarbon carboxylic acid.

5. The method of claim 2 wherein about 5 to 100 bulk unit volumes of siliceous sand are provided for each bulk unit volume of organic polymer precursor.

6. The method of claim 5 wherein a carrier material is included in the mixture of (a) of claim 1 at the rate of 1 gallon of carrier material for each 0.1 to 30 pounds of siliceous sand.

* * * * *